United States Patent
Dai et al.

(10) Patent No.: US 10,254,529 B2
(45) Date of Patent: Apr. 9, 2019

(54) METHOD AND APPARATUS FOR CALIBRATING IMAGE SENSOR ARRAY IN MICROSCOPIC IMAGING SYSTEM

(71) Applicant: Tsinghua University, Beijing (CN)

(72) Inventors: Qionghai Dai, Beijing (CN); Jingtao Fan, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 15/862,106

(22) Filed: Jan. 4, 2018

(65) Prior Publication Data

US 2018/0246312 A1   Aug. 30, 2018

(30) Foreign Application Priority Data

Feb. 27, 2017   (CN) .......................... 2017 1 0108792

(51) Int. Cl.
G02B 21/36   (2006.01)
G02B 21/00   (2006.01)
G02F 1/133   (2006.01)

(52) U.S. Cl.
CPC ....... *G02B 21/365* (2013.01); *G02B 21/0072* (2013.01); *G02F 1/13306* (2013.01); *G02B 21/368* (2013.01)

(58) Field of Classification Search
CPC .............. G02B 21/365; G02B 21/0072; G02B 21/368; G02F 1/13306
See application file for complete search history.

(56) References Cited

U.S. PATENT DOCUMENTS

| | | | | |
|---|---|---|---|---|
| 5,777,736 A | * | 7/1998 | Horton | G01J 3/453 356/456 |
| 6,587,276 B2 | * | 7/2003 | Daniell | H04N 13/307 359/622 |
| 2015/0071535 A1 | * | 3/2015 | Wang | H04N 1/58 382/167 |
| 2015/0297311 A1 | * | 10/2015 | Tesar | G02B 21/16 600/411 |
| 2016/0220324 A1 | * | 8/2016 | Tesar | G02B 21/0012 |

* cited by examiner

*Primary Examiner* — Zhihan Zhou
(74) *Attorney, Agent, or Firm* — David D. Brush; Westman, Champlin & Koehler, P.A.

(57) ABSTRACT

A method and an apparatus for calibrating an image sensor array in a microscopic imaging system are provided. The method includes: performing a vignetting effect calibration and correction on the image sensor array, such that pixels acquired by all sub-field-of-view image sensors for capturing a scene with a same radiant exitance have a same gray level; performing a light encoding on a temporal-spatial union structure using a spatial light modulator, to establish correspondences of a plurality of feature points between an image space and a physical space; performing a light decoding on the temporal-spatial union structure, to acquire pixel coordinates of the plurality of feature points in an image plane and physical coordinates of the plurality of feature points in a plane of the spatial light modulator; acquiring a homography relationship according to the pixel coordinates and the physical coordinates, acquiring a global coordinate mapping according to the homography relationship.

15 Claims, 1 Drawing Sheet

METHOD AND APPARATUS FOR CALIBRATING IMAGE SENSOR ARRAY IN MICROSCOPIC IMAGING SYSTEM

FIELD

The present disclosure relates to fields of structured light encoding, computational shooting and microscopic imaging, and more particularly relates to a method for calibrating an image sensor array in a microscopic imaging system.

BACKGROUND

With the development of microscopic biology, requirements for microscopic imaging technology have been increased. Acquiring a wide-field and high-resolution microscopic image in real time is a precondition for microscopic biology research. For a cancer research, for example, a high-resolution image is needed for observing a propagation step of cancer cells, while a wide field image is required for observing a migration of the cancer cells. In addition, acquiring the microscopic image at high speed and in real time is needed for observing a fast transmission of a signal via a neuron.

An image observed via an ocular of a microscope may be converted to a wide-field surface intermediary image via a series of objective lens groups, and sub-field-of-view high-resolution images can be obtained by performing a divided field collection on the surface intermediary image by the image sensor array. In order to gather the sub-field-of-view high-resolution images together to acquire a wide-field high-resolution image, a calibration on the image sensor array in a microscopic field is necessary.

Compared to a conventional imaging condition in the macroscopic scenario, it is rather a challenge to calibrate the image sensor array in the microscopic field. Firstly, due to a limitation of a shallow depth of focus of microscope objective lens, three-dimensional information of the calibration object is unable to be acquired by changing a location thereof. Additionally, it is difficult to perform the calibration step by step using a system includes multistage objective lens and cambered intermediate image. Therefore, a method for calibrating an image sensor array applied in a microscopic imaging system is needed, for satisfying a requirement of obtaining a wide-field high-resolution and real-time microscopic image.

SUMMARY

Embodiments of the present disclosure seek to solve at least one of the problems existing in the related art to at least some extent.

Accordingly, an objective of the present disclosure is to provide a method for calibrating an image sensor array in a microscopic imaging system, so as to satisfy a requirement of obtaining a wide-field high-resolution and real-time microscopic image.

According to a first aspect of embodiments of the present disclosure, there is provided a method for calibrating an image sensor array in a microscopic imaging system, including: performing a vignetting effect calibration and correction on the image sensor array, such that pixels acquired by all sub-field-of-view image sensors in the image sensor array have a same gray level when all the sub-field-of-view image sensors are configured to capture a scene with a same radiant exitance; performing a light encoding on a temporal-spatial union structure using a spatial light modulator, so as to establish correspondences of a plurality of feature points between an image space and a physical space, performing a light decoding on the temporal-spatial union structure, so as to acquire pixel coordinates of the plurality of feature points in an image plane and physical coordinates of the plurality of feature points in a plane of the spatial light modulator; and acquiring a homography relationship according to the pixel coordinates and the physical coordinates, and acquiring a global coordinate mapping according to the homography relationship.

Further, performing the vignetting effect calibration and correction on the image sensor array according to:

$$Pix'(x,y) = f(f^{-1}(Pix(x,y)) \cdot S(Dis(x,y)))$$

where $Pix'(x,y)$ represents a corrected gray level, $Pix(x,y)$ represents an original gray level, $f$ represents a camera response function, $S(Dis(x,y))$ represents a compensation coefficient related to a centrifugal distance.

Further, the spatial light modulator includes a film, a digital mirror device (DMD), a liquid crystal display (LCD) and a liquid crystal on silicon (LCOS).

Further, performing a light decoding on the temporal-spatial union structure also includes: extracting the pixel coordinates of the plurality of feature points in the image plane, and decoding the pixel coordinates according to an encoding scheme to acquire the physical coordinates of the plurality of feature points in the plane of the spatial light modulator.

Further, acquiring a homography relationship according to the pixel coordinates and the physical coordinates, and acquiring a global coordinate mapping according to the homography relationship also includes: establishing a first mapping from a physical location to a location of a pixel of a sub-field-of-view image using a homography matrix from a plane of the sub-field-of-view image sensor to the plane of the spatial light modulator after the homography matrix is acquired; acquiring a physical size corresponding to each pixel of a whole field image according to a total number of pixels corresponding to the whole field, so as to establish a second mapping from the physical location to a location of a pixel of the whole field image; and integrating the first mapping and the second mapping so as to obtain the global coordinate mapping from the location of the pixel of the whole field image to the location of the pixel of the sub-field-of-view image.

With the method provided in the present invention, a wide-field high-resolution and real-time microscopic image may be acquired.

According to a second aspect of embodiments of the present disclosure, there is provided an apparatus for calibrating an image sensor array in a microscopic imaging system, including: a processor; a memory configured to store an instruction executable by the processor; in which the processor is configured to: perform a vignetting effect calibration and correction on the image sensor array, such that pixels acquired by all sub-field-of-view image sensors in the image sensor array have a same gray level when all the sub-field-of-view image sensors are configured to capture a scene with a same radiant exitance; perform a light encoding on a temporal-spatial union structure using a spatial light modulator, so as to establish correspondences of a plurality of feature points between an image space and a physical space; perform a light decoding on the temporal-spatial union structure, so as to acquire pixel coordinates of the plurality of feature points in an image plane and physical coordinates of the plurality of feature points in a plane of the spatial light modulator; and acquire a homography relationship according to the pixel coordinates and the physical coordinates, and to acquire a global coordinate mapping according to the homography relationship.

With the apparatus provided in the present invention, a wide-field high-resolution and real-time microscopic image may be acquired.

According to a third aspect of embodiments of the present disclosure, there is provided a non-transitory computer-readable storage medium having stored therein instructions that, when executed by a processor of a terminal, causes a terminal to perform a method for calibrating an image sensor array in a microscopic imaging system for running an application program, the method includes: performing a vignetting effect calibration and correction on the image sensor array, such that pixels acquired by all sub-field-of-view image sensors in the image sensor array have a same gray level when all the sub-field-of-view image sensors are configured to capture a scene with a same radiant exitance; performing a light encoding on a temporal-spatial union structure using a spatial light modulator, so as to establish correspondences of a plurality of feature points between an image space and a physical space; performing a light decoding on the temporal-spatial union structure, so as to acquire pixel coordinates of the plurality of feature points in an image plane and physical coordinates of the plurality of feature points in a plane of the spatial light modulator; and acquiring a homography relationship according to the pixel coordinates and the physical coordinates, and acquiring a global coordinate mapping according to the homography relationship.

The above summary of the present disclosure is not intended to describe each disclosed embodiment or every implementation of the present disclosure. The Figures and the detailed descriptions which follow more particularly exemplify illustrative embodiments.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
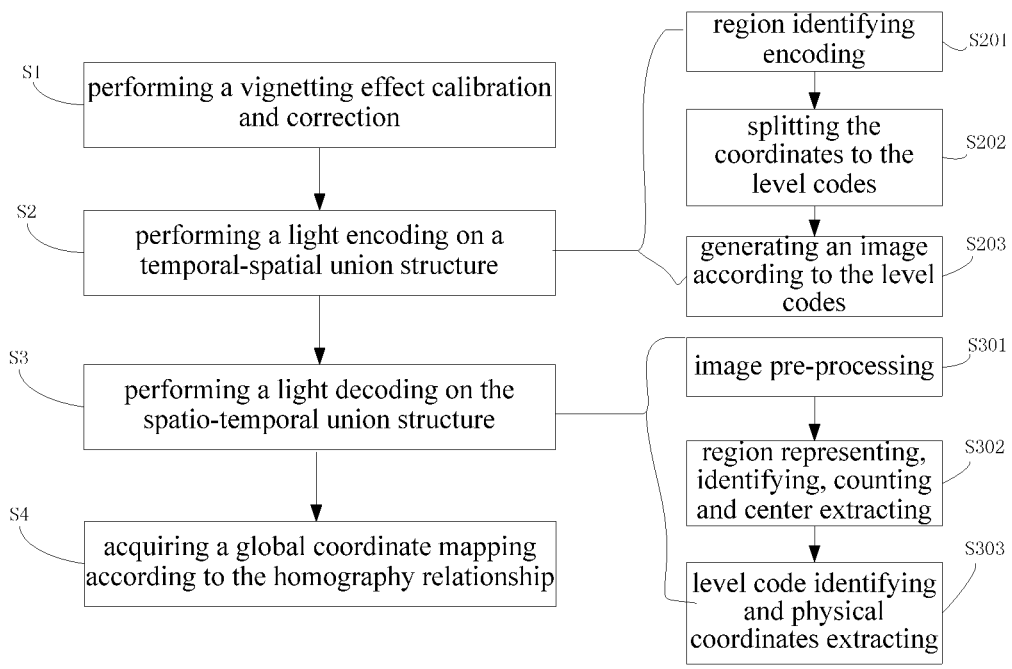
FIG. 1 is a flow chart of a method for calibrating an image sensor array in a microscopic imaging system according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In the specification, it should be understood that, relative terms such as "central", "longitudinal", "lateral", "above", "below", "front", "rear", "right", "left", "inner", "outer", "lower", "upper", "horizontal", "vertical", "top", "bottom", "inner", "outer" should be construed to refer to the orientation as then described or as shown in the drawings under discussion. These relative terms are for convenience of description and do not require that the present disclosure be constructed or operated in a particular orientation. In addition, terms such as "first" and "second" are used herein for purposes of description and are not intended to indicate or imply relative importance or significance.

In the present invention, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

Referring to the following descriptions and drawings, these and other aspects of the embodiments of the present disclosure will be apparent. In these descriptions and drawings, some specific approaches of the embodiments of the present disclosure are provided, so as to show some ways to perform the principle of the embodiments of the present disclosure, however it should be understood that the embodiment of the present disclosure is not limited thereby. Instead, the embodiments of the present disclosure comprise all the variants, modifications and their equivalents within the spirit and scope of the present disclosure as defined by the claims.

In the following, a method for calibrating an image sensor array in a microscopic imaging system according to embodiments of the present disclosure will be described in detail with reference to the drawings.

FIG. 1 is a flow chart of a method for calibrating an image sensor array in a microscopic imaging system according to an embodiment of the present disclosure. As shown in FIG. 1, the method includes following steps.

In step S1, a vignetting effect calibration and correction is performed on the image sensor array, such that pixels acquired by all sub-field-of-view image sensors in the image sensor array have a same gray level when all the sub-field-of-view image sensors are configured to capture a scene with a same radiant exitance.

In an embodiment, a sub-field-of-view image sensor is an image sensor of the image sensor array in a sub-field-of-view divided from a whole field.

Specifically, when the scene with the same radiant exitance is captured by a same image sensor, respective pixels may have a same gray level. A non-linearity vignetting correction model taking a camera response into account is represented as:

$$\mathrm{Pix}'(x,y) = f(f^{-1}(\mathrm{Pix}(x,y)) \cdot S(\mathrm{Dis}(x,y)))$$

where $\mathrm{Pix}'(x,y)$ represents a corrected gray level, $\mathrm{Pix}(x,y)$ represents an original gray level, $f$ represents a camera response function, $S(\mathrm{Dis}(x,y))$ represents a compensation coefficient related to a centrifugal distance.

In step S2, a light encoding is performed on a temporal-spatial union structure using a spatial light modulator, so as to establish correspondences of a plurality of feature points between an image space and a physical space.

Specifically, the spatial light modulator may write certain information into a light wave by modulating a parameter in a light field (for example, by modulating an amplitude in the light field, by modulating a phase via a refractive index, or by modulating a polarization state via a rotation of a polarization plane) under an active control, so as to modulate the light wave.

In an embodiment of the present disclosure, the spatial light modulator includes a film, a DMD (Digital Micromirror Device), an LCD (Liquid Crystal Display) and an LCOS (Liquid Crystal on Silicon). A color-separated binary temporal-spatial union intensity encoding of LCD is taken as an example in following descriptions. It could be understood for the skilled in the art that the temporal-spatial union intensity encoding may be performed using a film, a DMD and an LCOS.

Related terms are defined as follows.

LCD sub-pixel unit: when an LCD panel is observed using a microscope, it could be seen that a pixel consists of three sub-pixel units (R, G and B), and each LCD sub-pixel unit will form a region on an image after being captured by a camera.

Region: an imaging range of the LCD sub-pixel unit in the image captured. Attributes of the region (for example) includes color and location etc.

Attributes of the region: Region={color (R/G/B), pixelcount, center (center_u, center_v), code (code_x, code_y), x, y}, in which color (R/G/B) represents the category (red/green/blue) of the sub-pixel unit corresponding to the region, pixelcount represents a number of pixels included in the region, center (center_u, center_v) represents a coordinate of a center of the region, x and y represent the physical coordinates of the sub-pixel unit corresponding to the region, and code_x and code_y represent level codes of the sub-pixel unit corresponding to the region.

An encoding principle of the method is to encode from location to intensity, the intensity encoding scheme is established according to a row number and a column number of the location of the LCD sub-pixel unit. In the encoding scheme, sub-pixel units of three kinds (RGB) are encoded separately, and a plurality of images encoded according to the intensity encoding scheme in a row-column decomposition manner are generated according to binary values 0/1 corresponding to the row number and the column number of the location of the LCD sub-pixel unit.

Step S201: region identifying encoding. Three images in pure red, pure green and pure blue are displayed on an LCD screen respectively as identifications for regions in red, green and blue.

Step S202: splitting the coordinates to the level codes. It is defined that an x direction is from left to right of the LCD screen and a y direction is from bottom to top of the LCD screen. Each sub-pixel unit has the physical coordinates (x, y) and the row number (y' row) and the column number (x' column). The row number and the column number are converted to binary numbers, i.e., the level codes of the sub-pixel unit: code_x, code_y. According to a resolution of an LCD calibration panel, it is assumed that at least m bits and n bits level codes are needed for representing the row numbers and the column numbers of all the sub-pixel units, and therefore code_x and code_y are m bits and n bits respectively.

Step S203: generating an image according to the level codes. Encoding columns of R/G/B regions: m images may be needed, and a certain column of each image is entirely dark or entirely red/green/blue. Specifically, for the $j^{th}$ column of the $i^{th}$ image, if the $i^{th}$ bit of code_x (a binary number corresponding to j) is 1, the $j^{th}$ column is entirely red/green/blue, otherwise, the $j^{th}$ column is entirely dark.

Encoding rows of R/G/B regions: n images may be needed, and a certain row of each image is entirely dark or entirely red/green/blue. Specifically, for the $j^{th}$ row of the $i^{th}$ image, if the $i^{th}$ bit of code_y (a binary number corresponding to j) is 1, the $j^{th}$ row is entirely red/green/blue, otherwise, the $j^{th}$ row is entirely dark.

In step S3, a light decoding is performed on the temporal-spatial union structure, so as to acquire pixel coordinates of the plurality of feature points in an image plane and physical coordinates of the plurality of feature points in a plane of the spatial light modulator.

Specifically, the color-separated binary temporal-spatial union intensity encoding of LCD is taken as an example in following descriptions. It could be understood for the skilled in the art that the temporal-spatial union intensity encoding may be performed using a film, a DMD and an LCOS.

Step S301: image pre-processing. In an ideal state, the gray levels of a GAP region and a sub-pixel region configured as dark of the LCD in the captured image are CV0, and the gray level of the sub-pixel region configured as bright is CV1. In a practical capturing, the gray level of the image is not completely matched to that in the ideal state due to influence of noise and distortion. A pre-processing should be performed on the images in turn as follows: 1) self-adapted binary setting: setting the gray levels of the GAP region and the sub-pixel region configured as dark to be 0 and setting the gray level of the sub-pixel region configured as bright to be 1. 2) dilation and erosion: value 0 of the GAP region, value 0 of the sub-pixel region configured as dark and value 1 of the sub-pixel region configured as bright are cleared. 3) regions on an edge of the image which do not include the LCD sub-pixel unit entirely are eliminated.

Step S302: region representing, identifying, counting and center extracting, which aim to acquire pixel coordinates of the plurality of feature points in the image plane.

The imaged region of each LCD sub-pixel unit refers to Region={color(R/G/B), pixelcount, center (center_u, center_v), code (code_x, code_y), x, y}, in which the meanings of the attributes of the region are described in step S3. It could be known whether Region corresponds to the sub-pixel unit in red, green or blue via three region identifying encoded images, so as to acquire the value of color. The number of the pixels in the region is counted and recorded as pixelcount. A mean value of x coordinate values of all pixels in the region is center_u of the region, and the mean value of y coordinate values of all pixels in the region is center_v of the region, in which center_u and center_v are pixel coordinates of the feature point in the image plane.

Step S303, level code identifying and physical coordinates extracting.

Three region identifying images are eliminated. The captured encoded images are divided into six groups, which are row encoded images and column encoded images in R region, G region and B region respectively. For example, by decoding n row encoded images in R region, the level codes of the row numbers of any region with color=R are acquired. Specifically, in accordance with an encoding order, the gray levels 0/1 of the region in n images (pre-processing such as binary setting is performed thereon) are read, in which the gray levels 0/1 are written in sequence as n-bit binary number (i.e., the level code (code_y) corresponding to the row number). Similarly, remaining five groups of images are decoded to acquire the level code (code v) corresponding to the row number and the level code (code_x) corresponding to the column number of each region.

Attributes of each region, i.e., color(R/G/B), pixelcount, center (center_u, center_v), code (code_x, code_y), are decoded. Assume that a size (length*width) of the LCD sub-pixel unit is a μm*b μm, physical coordinates x and y corresponding to the region are acquired Let code_x' and code_y' to be decimal numbers corresponding respectively to code_x and code_y, and thus:

$$x = \begin{cases} \text{code\_x}' * a & \mu m \text{ color} == R \\ \text{code\_x}' * a + b & \mu m \text{ color} == R \\ \text{code\_x}' * a + 2b & \mu m \text{ color} == R \end{cases}$$

$$y = \text{code\_y}' * a \ \mu m$$

where x and y are the physical coordinates of the feature points in the plane of the spatial light modulator.

In step S4, a homography relationship is acquired according to the pixel coordinates and the physical coordinates, and a global coordinate mapping is acquired according to the homography relationship.

Specifically, in a computer vision, the homography relationship is defined as a mapping from one plane to another plane, for example, a mapping of a point on a two-dimensional plane to a camera imager. Point Q on a two-dimensional plane and point q on the imager are represented as homogeneous coordinates:

$$\vec{Q} = [XYZ1]^T$$

$$\vec{q} = [xy1]^T$$

Thus, the homography relationship may be represented in a matrix multiplication manner:

$$\vec{q} = sH\vec{Q}$$

where s is a scale of any size, such that a definition of homography relationship corresponds to this scale.

H consists of two parts: a physical transformation for locating the plane of an object to be observed and a projection using a parameter matrix in the camera, in which the physical transformation includes a rotation transformation R and a part translation transformation t, which can be represented as:

$$W = [Rt]$$

where R is a 3*3 matrix, t is a three-dimensional column vector.

The parameter matrix in the camera is indicated by M, and the homography relationship may be rewritten as:

$$\vec{q} = sMW\vec{Q}, \text{ where } M = \begin{bmatrix} f_x & 0 & c_x \\ 0 & f_y & c_y \\ 0 & 0 & 1 \end{bmatrix}$$

Since a research goal is a two-dimensional mapping from the plane of the spatial light modulator to the plane of the image sensor, $\vec{Q}$ in the above formula may be simplified as $\vec{Q}'$ in a horizontal coordinate system, i.e., let Z=0. The rotation transformation is written as a column vector $R = [r_1 \ r_2 \ r_3]$, and thus:

$$\begin{bmatrix} x \\ y \\ 1 \end{bmatrix} = sM[r_1 \ r_2 \ r_3 \ t]\begin{bmatrix} X \\ Y \\ 0 \\ 1 \end{bmatrix} = sM[r_1 \ r_2 \ t]\begin{bmatrix} X \\ Y \\ 1 \end{bmatrix}$$

The final homography relationship may be represented as:

$$\vec{q} = H\vec{Q}', \text{ where } H = sM[r_1 r_2 t]$$

where the homography matrix H is a 3*3 matrix.

Generally, four pairs of corresponding points in two planes are needed for solving H. Sufficient corresponding points (center_u, center_u) and (x, y) acquired in step S3 are substituted into the homography model and the homography matrix H is acquired. Algorithms for solving the homography matrix robustly include RANSAC etc.

A first mapping map1 from a physical location to a location of a pixel of the sub-field-of-view image is established using respective homography matrix from the plane of the sub-field-of-view image sensor to the plane of the spatial light modulator after the homography matrix is acquired. Additionally, a physical size corresponding to each pixel of the whole field image is acquired according to a total number of the pixels corresponding to the whole field, so as to establish a second mapping map2 from the physical location to a location of a pixel of the whole field image. The first mapping map1 and the second mapping map2 are integrated so as to obtain the global coordinate mapping map from the location of the pixel of the whole field image to the location of the pixel of the sub-field-of-view image in dependence on uniqueness of the physical location. Thus, the calibration of the image sensor array in the microscopic imaging system is finished. The global coordinate mapping indicates which ones of pixel locations in sub-field-of-view corresponding to a pixel location in the whole field. A wide-field high-resolution microscopic image may be acquired by performing Bilinear Interpolation on the sub-field-of-view image and performing weighted superposition on the pixels in an overlapped region between sub-field-of-view images according to the global coordinate mapping.

In the following, an apparatus for calibrating an image sensor array in a microscopic imaging system according to embodiments of the present disclosure will be described in detail with reference to the drawings.

Figure 2:
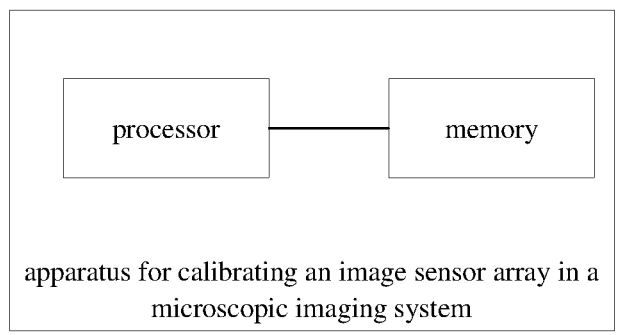
FIG. 2 is a block diagram of an apparatus for calibrating an image sensor array in a microscopic imaging system according to an embodiment of the present disclosure.

FIG. 2 is a block diagram of an apparatus for calibrating an image sensor array in a microscopic imaging system according to an embodiment of the present disclosure.

In some embodiments, the apparatus includes a processor; a memory configured to store an instruction executable by the processor, in which the processor is configured to:

perform a vignetting effect calibration and correction on the image sensor array, such that pixels acquired by all sub-field-of-view image sensors in the image sensor array have a same gray level when all the sub-field-of-view image sensors are configured to capture a scene with a same radiant exitance;

perform a light encoding on a temporal-spatial union structure using a spatial light modulator, so as to establish correspondences of a plurality of feature points between an image space and a physical space;

perform a light decoding on the temporal-spatial union structure, so as to acquire pixel coordinates of the plurality of feature points in an image plane and physical coordinates of the plurality of feature points in a plane of the spatial light modulator; and acquire a homography relationship according to the pixel coordinates and the physical coordinates, and acquire a global coordinate mapping according to the homography relationship.

Specifically, when the scene with the same radiant exitance is captured by a same image sensor, respective pixels may have a same gray level. A non-linearity vignetting correction model taking a camera response into account is represented as:

$$Pix'(x,y)=f(f'(Pix(x,y))\cdot S(Dis(x,y)))$$

where Pix'(x, y) represents a corrected gray level, Pix(x, y) represents an original gray level, $f$ represents a camera response function, S(Dis(x, y)) represents a compensation coefficient related to a centrifugal distance.

Specifically, the spatial light modulator may write certain information into a light wave by modulating a parameter in a light field (for example, by modulating an amplitude in the light field, by modulating a phase via a refractive index, or by modulating a polarization state via a rotation of a polarization plane) under an active control, so as to modulate the light wave.

In an embodiment of the present disclosure, the spatial light modulator includes a film, a DMD (Digital Micromirror Device), an LCD (Liquid Crystal Display) and an LCOS (Liquid Crystal on Silicon). A color-separated binary temporal-spatial union intensity encoding of LCD is taken as an example in following descriptions. It could be understood for the skilled in the art that the temporal-spatial union intensity encoding may be performed using a film, a DMD and an LCOS.

Further, the processor is configured to perform a light decoding on the temporal-spatial union structure by: extracting the pixel coordinates of the plurality of feature points in the image plane, and decoding the pixel coordinates according to an encoding scheme to acquire the physical coordinates of the plurality of feature points in the plane of the spatial light modulator.

Further, the processor is configured to acquire a homography relationship according to the pixel coordinates and the physical coordinates, and acquire a global coordinate mapping according to the homography relationship by acts of establishing a first mapping from a physical location to a location of a pixel of a sub-field-of-view image using a homography matrix from a plane of the sub-field-of-view image sensor to the plane of the spatial light modulator after the homography matrix is acquired; acquiring a physical size corresponding to each pixel of a whole field image according to a total number of pixels corresponding to the whole field, so as to establish a second mapping from the physical location to a location of a pixel of the whole field image; and integrate the first mapping and the second mapping so as to obtain the global coordinate mapping from the location of the pixel of the whole field image to the location of the pixel of the sub-field-of-view image.

With respect to the apparatus in the above embodiments, the specific manners for performing operations for individual modules therein have been described in detail in the method embodiments, which are not elaborated herein again.

In the following, a non-transitory computer-readable storage medium according to embodiments of the present disclosure will be described in detail.

In some embodiments, the non-transitory computer-readable storage medium having stored therein instructions that, when executed by a processor of a terminal, causes the terminal to perform a method for calibrating an image sensor array in a microscopic imaging system according to the above embodiments of the present disclosure for running an application program.

In addition, other un-mentioned elements and functions of the method and the apparatus for calibrating an image sensor array in a microscopic imaging system in the embodiments of the present disclosure are known for the skilled in the art, which will not described herein.

Any process or method described in the flowing diagram or other means may be understood as a module, segment or portion including one or more executable instruction codes of the procedures configured to achieve a certain logic function or process, and the preferred embodiments of the present disclosure include other performances, in which the performance may be achieved in other orders instead of the order shown or discussed, such as in a almost simultaneous way or in an opposite order, which should be appreciated by those having ordinary skills in the art to which embodiments of the present disclosure belong.

The logic and/or procedures indicated in the flowing diagram or described in other means herein, such as a constant sequence table of the executable code for performing a logical function, may be implemented in any computer readable storage medium so as to be adopted by the code execution system, the device or the equipment (such a system based on the computer, a system including a processor or other systems fetching codes from the code execution system, the device and the equipment, and executing the codes) or to be combined with the code execution system, the device or the equipment to be used. With respect to the description of the present invention, "the computer readable storage medium" may include any device including, storing, communicating, propagating or transmitting program so as to be used by the code execution system, the device and the equipment or to be combined with the code execution system, the device or the equipment to be used. The computer readable medium includes specific examples (a non-exhaustive list): the connecting portion (electronic device) having one or more arrangements of wire, the portable computer disc cartridge (a magnetic device), the random access memory (RAM), the read only memory (ROM), the electrically programmable read only memory (EPROMM or the flash memory), the optical fiber device and the compact disk read only memory (CDROM). In addition, the computer readable storage medium even may be papers or other proper medium printed with program, as the papers or the proper medium may be optically scanned, then edited, interpreted or treated in other ways if necessary to obtain the program electronically which may be stored in the computer memory.

It should be understood that, each part of the present invention may be implemented by the hardware, software, firmware or the combination thereof. In the above embodiments of the present invention, the plurality of procedures or methods may be implemented by the software or hardware stored in the computer memory and executed by the proper code execution system. For example, if the plurality of procedures or methods is to be implemented by the hardware, like in another embodiment of the present invention, any one of the following known technologies or the combination thereof may be used, such as discrete logic circuits having logic gates for implementing various logic functions upon an application of one or more data signals, application specific integrated circuits having appropriate logic gates, programmable gate arrays (PGA), field programmable gate arrays (FPGA).

It can be understood by those having the ordinary skills in the related art that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The non-transitory computer-readable storage medium may be, but is not limited to, read-only memories, magnetic disks, or optical disks.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for calibrating an image sensor array in a microscopic imaging system, comprising:
    performing a vignetting effect calibration and correction on the image sensor array, such that pixels acquired by all sub-field-of-view image sensors in the image sensor array have a same gray level when all the sub-field-of-view image sensors are configured to capture a scene with a same radiant exitance);
    performing a light encoding on a temporal-spatial union structure using a spatial light modulator, so as to establish correspondences of a plurality of feature points between an image space and a physical space;
    performing a light decoding on the temporal-spatial union structure, so as to acquire pixel coordinates of the plurality of feature points in an image plane and physical coordinates of the plurality of feature points in a plane of the spatial light modulator; and
    acquiring a homography relationship according to the pixel coordinates and the physical coordinates, and acquiring a global coordinate mapping according to the homography relationship.

2. The method according to claim 1, wherein performing the vignetting effect calibration and correction on the image sensor array according to:

$$Pix'(x,y)=f(f^{-1}(Pix(x,y))\cdot S(Dis(x,y)))$$

where Pix'(x,y) represents a corrected gray level Pix(x,y) represents an original gray level, $f$ represents a camera response function, S(Dis(x,y)) represents a compensation coefficient related to a centrifugal distance.

3. The method according to claim 1, wherein the spatial light modulator comprises a film, a digital mirror device (DMD), a liquid crystal display (LCD) and a liquid crystal on silicon (LCOS).

4. The method according to claim 1, wherein performing a light decoding on the temporal-spatial union structure further comprises:
    extracting the pixel coordinates of the plurality of feature points in the image plane, and decoding the pixel coordinates according to an encoding scheme to acquire the physical coordinates of the plurality of feature points in the plane of the spatial light modulator.

5. The method according to claim 1, wherein acquiring a homography relationship according to the pixel coordinates and the physical coordinates, and acquiring a global coordinate mapping according to the homography relationship further comprises:
    establishing a first mapping from a physical location to a location of a pixel of a sub-field-of-view image using a homography matrix from a plane of the sub-field-of-view image sensor to the plane of the spatial light modulator after the homography matrix is acquired;
    acquiring a physical size corresponding to each pixel of a whole-field image according to a total number of pixels corresponding to the whole field, so as to establish a second mapping from the physical location to a location of a pixel of the whole field image; and
    integrating the first mapping and the second mapping so as to obtain the global coordinate mapping from the location of the pixel of the whole field image to the location of the pixel of the sub-field-of-view image.

6. An apparatus for calibrating an image sensor array in a microscopic imaging system, comprising:
    a processor;
    a memory configured to store an instruction executable by the processor;
    wherein the processor is configured to:
        perform a vignetting effect calibration and correction on the image sensor array, such that pixels acquired by all sub-field-of-view image sensors in the image sensor array have a same gray level when all the sub-field-of-view image sensors are configured to capture a scene with a same radiant exitance;
        perform a light encoding on a temporal-spatial union structure using a spatial light modulator, so as to establish correspondences of a plurality of feature points between an image space and a physical space;
        perform a light decoding on the temporal-spatial union structure, so as to acquire pixel coordinates of the plurality of feature points in an image plane and physical coordinates of the plurality of feature points in a plane of the spatial light modulator; and
        acquire a homography relationship according to the pixel coordinates and the physical coordinates, and to acquire a global coordinate mapping according to the homography relationship.

7. The apparatus according to claim 6, wherein the processor is configured to perform the vignetting effect calibration and correction on the image sensor array according to:

$$Pix'(x,y)=f(f^{-1}(Pix(x,y))\cdot S(Dis(x,y)))$$

where Pix'(x,y) represents a corrected gray level, Pix(x,y) represents an original gray level, $f$ represents a camera response function, S(Dis(x,y)) represents a compensation coefficient related to a centrifugal distance.

8. The apparatus according to claim 6, wherein the spatial light modulator comprises a film, a DMD, an LCD and an LCOS.

9. The apparatus according to claim 6, wherein the processor is configured to perform a light decoding on the temporal-spatial union structure by:
  extracting the pixel coordinates of the plurality of feature points in the image plane, and decoding the pixel coordinates according to an encoding scheme to acquire the physical coordinates of the plurality of feature points in the plane of the spatial light modulator.

10. The apparatus according to claim 6, wherein the processor is configured to acquire a homography relationship according to the pixel coordinates and the physical coordinates, and acquire a global coordinate mapping according to the homography relationship by acts of:
  establishing a first mapping from a physical location to a location of a pixel of a sub-field-of-view image using a homography matrix from a plane of the sub-field-of-view image sensor to the plane of the spatial light modulator after the homography matrix is acquired;
  acquiring a physical size corresponding to each pixel of a whole field image according to a total number of pixels corresponding to the whole field, so as to establish a second mapping from the physical location to a location of a pixel of the whole field image; and
  integrating the first mapping and the second mapping so as to obtain the global coordinate mapping from the location of the pixel of the whole field image to the location of the pixel of the sub-field-of-view image.

11. A non-transitory computer-readable storage medium having stored therein instructions that, when executed by a processor of a terminal, causes a terminal to perform a method for calibrating an image sensor array in a microscopic imaging system for running an application program, the method comprises:
  performing a vignetting effect calibration and correction on the image sensor array, such that pixels acquired by all sub-field-of-view image sensors in the image sensor array have a same gray level when all the sub-field-of-view image sensors are configured to capture a scene with a same radiant exitance;
  performing a light encoding on a temporal-spatial union structure using a spatial light modulator, so as to establish correspondences of a plurality of feature points between an image space and a physical space;
  performing a light decoding on the temporal-spatial union structure, so as to acquire pixel coordinates of the plurality of feature points in an image plane and physical coordinates of the plurality of feature points in a plane of the spatial light modulator; and
  acquiring a homography relationship according to the pixel coordinates and the physical coordinates, and acquiring a global coordinate mapping according to the homography relationship.

12. The non-transitory computer-readable storage medium according to claim 11, wherein performing the vignetting effect calibration and correction on the image sensor array according to:

$$Pix'(x,y)=f(f^{-1}(Pix(x,y))\cdot S(Dis(x,y)))$$

where $Pix'(x,y)$ represents a corrected gray level, $Pix(x,y)$ represents an original gray level, $f$ represents a camera response function, $S(Dis(x,y))$ represents a compensation coefficient related to a centrifugal distance.

13. The non-transitory computer-readable storage medium according to claim 11, wherein the spatial light modulator comprises a film, a DMD, an LCD and an LCOS.

14. The non-transitory computer-readable storage medium according to claim 11, wherein performing a light decoding on the temporal-spatial union structure further comprises:
  extracting the pixel coordinates of the plurality of feature points in the image plane, and decoding the pixel coordinates according to an encoding scheme to acquire the physical coordinates of the plurality of feature points in the plane of the spatial light modulator.

15. The non-transitory computer-readable storage medium according to claim 11, wherein acquiring a homography relationship according to the pixel coordinates and the physical coordinates, and acquiring a global coordinate mapping according to the homography relationship further comprises:
  establishing a first mapping from a physical location to a location of a pixel of a sub-field-of-view image using a homography matrix from a plane of the sub-field-of-view image sensor to the plane of the spatial light modulator after the homography matrix is acquired;
  acquiring a physical size corresponding to each pixel of a whole field image according to a total number of pixels corresponding to the whole field, so as to establish a second mapping from the physical location to a location of a pixel of the whole field image; and
  integrating the first mapping and the second mapping so as to obtain the global coordinate mapping from the location of the pixel of the whole field image to the location of the pixel of the sub-field-of-view image.

\* \* \* \* \*